United States Patent
Callaghan et al.

(10) Patent No.: US 7,680,791 B2
(45) Date of Patent: Mar. 16, 2010

(54) METHOD FOR SORTING DATA USING COMMON PREFIX BYTES

(75) Inventors: Mark D. Callaghan, Palo Alto, CA (US); Wei Z. Li, San Carlos, CA (US); William H. Waddington, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 314 days.

(21) Appl. No.: 11/039,024

(22) Filed: Jan. 18, 2005

(65) Prior Publication Data

US 2006/0161546 A1      Jul. 20, 2006

(51) Int. Cl.
G06F 17/30      (2006.01)
G06F 15/16      (2006.01)

(52) U.S. Cl. ......................................................... 707/7
(58) Field of Classification Search ...................... 707/7
See application file for complete search history.

(56) References Cited

U.S. PATENT DOCUMENTS

| | | | |
|---|---|---|---|
| 5,001,477 A | 3/1991 | Hicks et al. | |
| 5,414,834 A | 5/1995 | Alexander et al. | |
| 5,490,269 A * | 2/1996 | Cohn et al. | 707/7 |
| 5,729,732 A * | 3/1998 | Gal et al. | 707/7 |
| 5,828,853 A | 10/1998 | Regal | |
| 2003/0182278 A1 | 9/2003 | Valk | |
| 2003/0182310 A1 | 9/2003 | Charnock et al. | |
| 2004/0002954 A1 * | 1/2004 | Chaudhuri et al. | 707/2 |
| 2006/0112097 A1 | 5/2006 | Callaghan et al. | 707/7 |

OTHER PUBLICATIONS

Robert Sedgewick, Algoithms in Java, Third Edition, Parts 1-4: Fundamentals, Data Structures, Sorting, Searching, Published Jul. 23, 2002 (Chapter 7 pp. 1-6; Chapter 7.6 pp. 1-3; Chapter 10 pp. 1-5; Chapter 10.3 pp. 1-7).*

Susan Visser, Bill Wong, Sams Teach Yourself DB2® Universal Database™ in 21 Days, Second Edition, Published Aug. 20, 2003 (Chapter 2 Section 3—Data Integrity pp. 1-14; Chapter 20 Section 5 Input / Output Performance pp. 1-5).*

Robert Sedgewick, Algoithms in Java, Third Edition; Published Jul. 23, 2002 (Chapter 10 Section 4 pp. 1-7).*

McIlroy et al; Engineering Radix Sort; Published 1993; pp. 1-15.*

Engineering Radix Sort Proof of Date pp. 1-4, Published Feb. 2009.*

Baer, Jean-Loup, "Improving Quicksort Performance with a Codeword Data Structure", *IEEE Transactions on Software Engineering*, vol. 15 (1989) pp. 622-631.

Bentley, Jon L. et al., "Fast Algorithms for Sorting and Searching Strings", pp. 1-10.

(Continued)

*Primary Examiner*—John E Breene
*Assistant Examiner*—Alex Gofman
(74) *Attorney, Agent, or Firm*—Hickman Palermo Truong & Becker LLP; Marcel K. Bingham; Sarah M. Savage (57) ABSTRACT

Several techniques for sorting item are described, generally referred to as (1) common prefix skipping quicksort; (2) key substring caching; and (3) adaptive quicksort. With common prefix skipping quicksort, common prefix bytes among all key values for a partition are computed while performing a quicksort partitioning operation, and the known common bytes are skipped when comparing two key values in a recursive partitioning operation. With key substring caching, each item is represented in a cached array comprising a particular number of bytes for respective portions of key values ("key substring"), where the key substring cache is updated contain bytes beyond the known number of common prefix bytes. An adaptive quicksort routine is a hybrid of a quicksort function and most significant digit radix sort function, where the functions are mutually recursive.

40 Claims, 3 Drawing Sheets

OTHER PUBLICATIONS

Blasgen, Michael W. et al., "An Encoding Method for Multifield Sorting and Indexing" *Association for Computing Machinery, Inc.* (1977) pp. 874-878.

Conner, W.M., "Offset Value Coding", *IBM Technical Disclosure Bulletin* (1977) 5 pages.

Knuth, Donald E., "The Art of Computer Programming", *Addison Wesley Longman*, vol. 3, $2^{nd}$ edition, section 5.2.2 (1998) pp. 105-138.

Sedgewick, R., "Algorithms Third Edition in C++, Parts 1-4" *Addison Wesley Longman* (1998) Chapter 7 (pp. 315-345) and Chapter 10, sections 10.3 and 10.4 (pp. 427-439).

"7.3 Quick Sort" retrieved on Sep. 10, 2004 from the Internet< URL: http://ciips.ee.uwa.edu.au/~morris/Year2/PLDS210/qsort.html.>.

"7.5 Radix Sorting" retrieved on Sep. 10, 2004 from the Internet< URL: http://ciips.ee.uwa.edu.au/~morris/Year2/PLDS210/radixsort.html.>.

* cited by examiner

METHOD FOR SORTING DATA USING COMMON PREFIX BYTES

CROSS REFERENCE TO RELATED APPLICATIONS

This application is related to U.S. patent application Ser. No. 10/996,742 filed on Nov. 24, 2004 by Mark D. Callaghan et al, entitled "Encoding Data To Be Sorted"; the content of which is incorporated by this reference in its entirety for all purposes as if fully disclosed herein.

FIELD OF THE INVENTION

The present invention relates to computer-implemented sorting of items using sort algorithms.

BACKGROUND

In the current age of information technology, massive volumes of data are generated, stored and processed, to meet innumerable needs. Over the years, much effort has been devoted to developing better data storage and sort technologies, in order to handle the data expansion that has occurred, both in volume and use of data.

One aspect of efforts to manage the ever-expanding volume of and reliance on data involves the evolution of database technology and, specifically, relational database technology. In relational databases, rows are composed of multiple columns. During processing of data from a database, the data items extracted from rows are frequently ordered by one or more associated columns or fields. The fields by which data items are sorted are referred to as sort keys. For example, a query on a table may be as follows:

select * from emp order by surname, first_name, social_security_no. In this example, the surname, first_name, and social_security_no fields are all sort keys.

Sort Algorithms

Sort algorithms are used to sort data. Most sort algorithms are either comparison-based or radix-based. Popular comparison-based sort algorithms include quicksort, mergesort and heapsort. Popular radix-based sort algorithms include radix sort and bucket sort. Performance of a sort algorithm is measured by the number of times that work is performed for all of the data items being sorted.

—Comparison-Based Sort Algorithms

The performance of comparison-based sort algorithms is described by the number of comparisons that are required to order n items. The quicksort algorithm, a comparison-based algorithm, is described by C. A. R. Hoare, in "Partition: Algorithm 63," "Quicksort: Algorithm 64," and "Find: Algorithm 65." *Comm. ACM* 4, 321-322, 1961. Generally, a quicksort algorithm uses the divide and conquer paradigm to sort items, in which (a) an item from the group of items being sorted is selected as the "pivot", (b) the remaining items are partitioned (i.e., grouped) into two groups, those greater than (or greater than or equal to) the pivot and those less than the pivot, and (c) the groups are recursively sorted. Quicksort algorithms require $O(n \log n)$ comparisons to sort n items on average, and $O(n^2)$ comparisons in the worst case.

A quicksort algorithm generally has the following properties: (a) the algorithm can be implemented by a recursive function; (b) the number of keys to be examined by a recursive invocation decreases as the depth of recursion increases; (c) the keys to be examined by a recursive invocation are a subset of the keys examined by any ancestor on the call stack; and (d) all comparisons performed for a given invocation are performed before the recursive invocations are made.

—Radix-Based Sort Algorithms

The performance of radix-based sort algorithms is described by the number of times that each item must be examined. The radix sort algorithm, a multiple pass distribution sort algorithm, (a) distributes each item to a bucket according to part of the item's sort key beginning with the least significant part of the key (in the case of least significant digit ("LSD") radix sort) or the most significant part of the key (in the case of most significant digit ("MSD") radix sort), and after each pass, (b) collects the items from the buckets, in relative order, to redistribute based on the next most significant (for LSD radix sort), or the next least significant (for MSD radix sort) part of the key. Radix sort algorithms require n* key_size comparisons to sort n items on average, where "key_size" is the size of the sort key.

Hence, when "key_size" is less than log(n), radix-based sort algorithms are faster than comparison-based sort algorithms. That is, generally, when "key size" is small, radix sort algorithms are faster than comparison-based sort algorithms, and when "key_size" is large, comparison-based sort algorithms are faster than radix-based sort algorithms.

SUMMARY OF EMBODIMENTS OF THE INVENTION

Techniques are provided for sorting data. These techniques are generally referred to herein as (1) common prefix skipping quicksort; (2) key substring caching; and (3) adaptive quicksort, which is a hybrid of quicksort and most significant digit radix sort. The adaptive quicksort algorithm is applicable to sort keys that are byte-orderable, which means that value for the keys can be compared by byte comparison.

The adaptive quicksort algorithm is faster than radix-based algorithms when the keys are large, and is faster than comparison-based algorithms in all cases, because:

(1) the algorithm performs fewer comparisons than conventional quicksort algorithms, in all scenarios;

(2) the algorithm performs fewer comparisons than conventional radix sort algorithms, for scenarios in which there are large values (i.e., large number of bytes needed to represent the value) for sort keys;

(3) the algorithm examines fewer key bytes while comparing keys; and (4) the algorithm incurs fewer memory system cache misses.

Because it is difficult to determine the average size of key values prior to a sort in a relational database management system, it is difficult to determine when to use a radix-based sort and when to use a comparison-based sort. The adaptive quicksort algorithm does not require such a determination.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Key Conditioning-Generally

Key conditioning involves the construction of a byte orderable array from a possibly multi-field key (concatenated key). Values for sort keys are conditioned prior to execution of a sort routine or algorithm, to facilitate an accurate and/or efficient sort procedure by the routine. For example, key conditioning may be applied to values in one or more columns of a database table, where the column(s) are used as keys for sorting rows of the table.

Techniques for key conditioning are described in U.S. patent application Ser. No. 10/996,742, entitled "Encoding Data To Be Sorted". The encoding techniques described therein may be applied to key values prior to subjecting the resulting encoded values to sorting techniques described herein. Different aspects of key conditioning apply to different scenarios. In the reference, six factors are described which are used to determine how the key fields are encoded in the byte orderable array. The factors are:

(1) Do nulls compare high or low?
(2) Is the field fixed width or variable width?
(3) Is the field guaranteed to be not null?
(4) Is the field ordered ascending or descending?
(5) Is the field the last field of a multi-field sort key, or the only field of a sort key?
(6) Is the field likely to contain the value "0"?

Quicksort Partition into Three Sets

In one embodiment, in the context of quicksort, the items are partitioned into three groups rather than two groups. That is, rather than partitioning the items into "less than the pivot" and "greater than the pivot" sets for each recursion, the items are partitioned into "less than the pivot," "equal to the pivot," and "greater than the pivot" sets. Three-way partitioning avoids worst case performance when there are a lot of duplicate keys because once the values that are equal to the pivot are placed in the corresponding set, then the algorithm does not need to process those values any further in subsequent recursions. Thus, the algorithm quickly classifies those values.

The use of three partitions with a quicksort routine is described in "Algorithms in C++", Parts 1-4: Fundamentals, Data Structure, Sorting, Searching, $3^{rd}$ Edition, by Robert Sedgewick; the content of which is incorporated by this reference in its entirety for all purposes as if fully disclosed herein.

Common Prefix Skipping Quicksort ("CPS-QS")

A common prefix is, for a set of keys in which each key is a byte array (e.g., a single field key or the output from key conditioning of concatenated keys), the bytes, from left to right, that all key values have in common. "Common prefix skipping" refers to an optimization that enables faster key comparisons by skipping a comparison of the common prefix of two key values when comparing the key values. In one embodiment, common prefix skipping is performed on key values that have been encoded using key conditioning as described in U.S. patent application Ser. No. 10/996,742 and when all of the keys to be compared are known to have a common prefix.

Common prefix skipping quicksort applies common prefix skipping to a quicksort algorithm. There are two aspects to CPS-QS: (A) computing the common prefix during execution of the algorithm, and (B) skipping the common prefix when comparing key values. CPS-QS enables better performance (i.e., a faster sort process) than three-way radix quicksort (described in "Algorithms in C++" by Sedgewick) for short keys and enables much better performance (i.e., an even faster sort process) for large keys. "Short keys" refers to keys having values that are represented with relatively few bytes, and "large keys" refers to keys having values that are represented with relatively many bytes.

In one embodiment, a conventional quicksort algorithm is augmented with a comparison partitioning routine that takes the following three inputs: (A) the key value for the item (e.g., a row of a database table) being compared to the pivot value (i.e., the key value for the item selected as the pivot); (B) the pivot value; and (C) the common prefix ("CP"; set to zero at start of routine). This comparison routine performs a byte-wise comparison between the item key value and the pivot value, starting at the first byte after the common prefix (i.e., CP+1). The comparison routine stops comparing the two values at either (a) the end of the shorter key or (b) the first byte that differs between the two values, whichever comes first.

The comparison routine returns the following two results: (A) the comparison result (e.g., whether the item key value is less than: "lt", greater than: "gt", equal to: "eq", the pivot value); and (B) the index into the byte-ordered key where the two values first differ (i.e., the CP between the item value and the pivot value). For a simple example, assume a byte array input value (0, 0, 1, 1), a pivot value (0, 0, 1, 2), and a CP input value of 2 (a known common prefix of two bytes). The routine starts comparing bytes at the third byte, determines that they are the same (both "1"s), moves to the next byte and determines that they are different ("1" versus "2"), and stops comparing the two values. It returns a result indicating that the input value is less than the pivot ("1" is less than "2") and that the CP between the two values ("CP_at") is "3" (first 3 bytes are common).

The routine logic continues by (A) placing the input value into the appropriate grouping set, "lt"; (B) comparing the current value of CP for the "lt" set ("lt_CP") with CP_at; and (C) setting the lt_CP value to the lesser of the two (e.g., min(lt_CP, CP_at)). Thus, lt_CP is used to track the current common prefix for all of the key values that have been placed in the "lt" set. Similarly, the current value of CP for the "gt" set ("gt_CP") is tracked throughout the execution of the comparison routine. Further, in an embodiment in which three partitions are used, the key values that are equal to the pivot value are placed into the "eq" grouping set. Once a pass is made through the entire input set, the values are partitioned into the grouping sets and the common prefix for each of the "lt" set and the "gt" set is known. Then, CPS-QS is recursively invoked, as many times as necessary.

Hence, the common prefix for each of the "lt" and "gt" sets is efficiently computed, throughout execution of the comparison routine, and used in each recursion to limit the amount of byte comparisons that need be performed when comparing two key values (input and pivot) for which the minimum common prefix is known. Consequently, and significantly, the CPS_QS algorithm provides a faster comparison than conventional quicksort algorithms, because the known common bytes are skipped when comparing two values.

Figure 1:
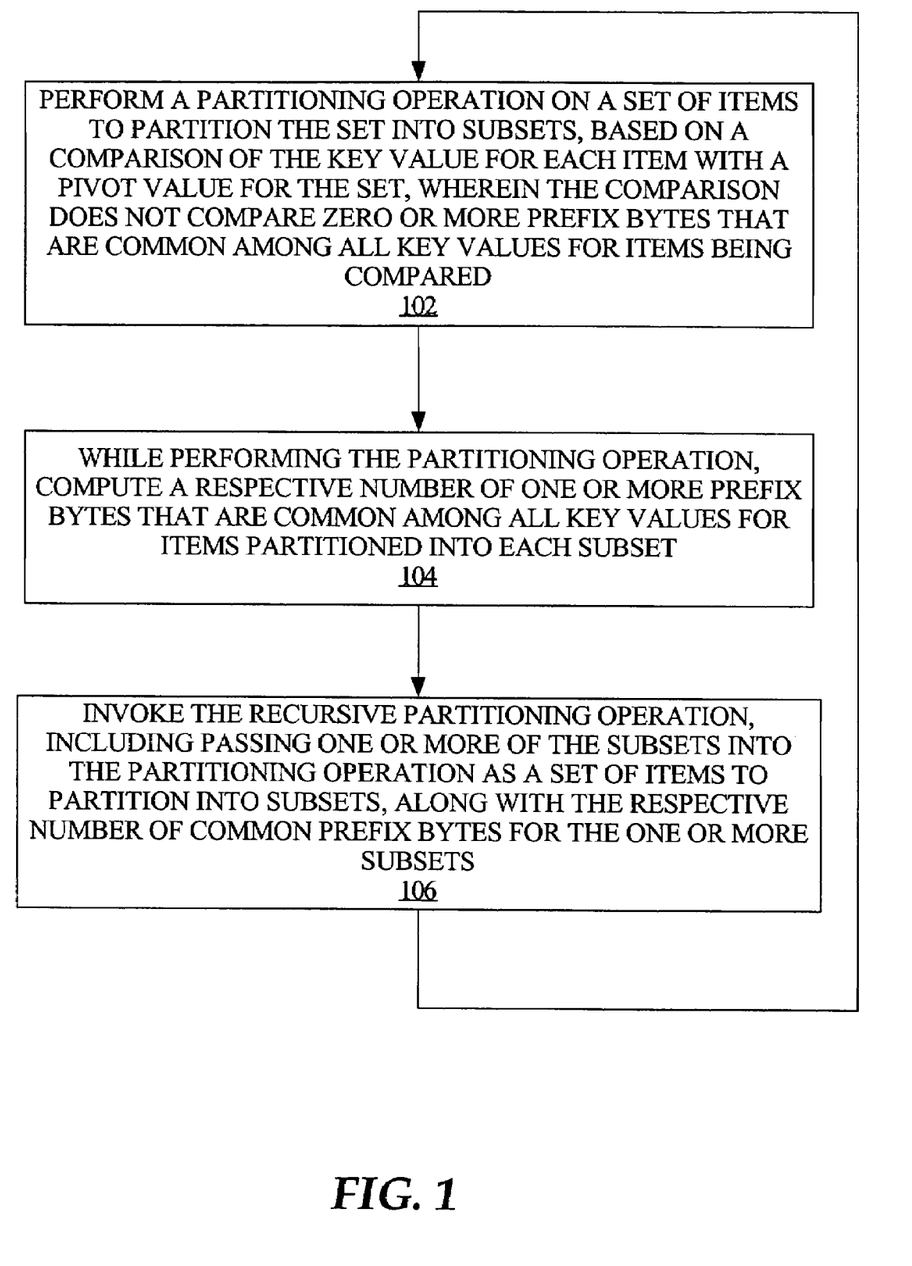
FIG. 1 is a flow diagram that illustrates a method for sorting a set of items, according to an embodiment of the invention.

FIG. 1 is a flow diagram that illustrates a method for sorting a set of items, according to an embodiment of the invention. The sorting of the items is based on one or more sort keys, where each item in the set has one or more key values that are represented by an array of bytes and the items are byte-orderable based on the arrays. FIG. 1 illustrates a common prefix skipping quicksort function.

At block 102, a partitioning operation is performed on a set of items, such as rows, to partition the set into subsets of items. The partitioning operation is based on a comparison of the key value(s) for each item, with a pivot value for the set. For example, a quicksort-based routine is executed to partition the set of items into the following subsets: (a) items having key values less than the pivot; (b) items having key values greater than the pivot; and, possibly, (c) items having key values equal to the pivot. Significantly, the comparison does not compare common prefix bytes that are common among all the key values for items being compared, if any are known. Hence, at block 102, the comparison does not compare zero or more common prefix bytes that are common among all the key values for items being compared. For example, at the time of the first performance of the recursive partitioning operation, there may not be a known common prefix.

At block 104, while performing the partitioning operation of block 102, respective common prefixes are computed for each subset. That is, the number of prefix bytes that are common among all key values for items partitioned into each subset is computed. For example, the common prefix for the "less than" subset and the common prefix for the "greater than" subset are computed while partitioning the items into one of these subsets.

At block 106, the recursive partitioning operation is invoked, including passing each of one or more of the subsets to the partitioning operation as a set of items to partition into subsets, along with the respective common prefix for each subset. For example, the first "less than" subset is passed back into the partitioning operation, a new pivot is selected for this subset, and the subset is partitioned further as in block 102. The partitioning is based on a comparison of the key value(s) for each item from the first "less than" subset, with the new pivot value for this subset. Significantly, the comparison does not compare common prefix bytes, computed at block 104 and passed to the partitioning operation at block 106, that are common among all the key values for the items in the subset being compared. Blocks 102-106 are performed repeatedly until all the items in the original set have been sorted, i.e., ordered.

Key Substring Caching

The term "key substring caching" refers to an enhancement to quicksort and radix sort algorithms, including the common prefix skipping quicksort described herein. Use of key substring caching provides better memory system behavior, as described hereafter.

When sorting a set of items (e.g., a set of rows) based on a sort key, the items may have different sizes. Thus, it is challenging to efficiently representing the set of items in a data structure in order to compare the data items, because the items often are of different sizes. One approach is to represent the array of items as an array of pointers, where each pointer has a fixed size. Each pointer identifies the respective memory location (e.g., memory address) of a respective item being sorted. Thus, any time a comparison between two items is performed, the respective pointers are dereferenced to find the key value for each item, and the bytes that represent the key values are retrieved.

However, with this approach, each time two key values are compared, random memory locations are accessed. For example, when performing the comparison between the first two items, it may be necessary to access main memory to read the items. Accessing main memory may take on the order of one hundred times more CPU cycle-time than accessing registers. Thus, when items for an operation must be fetched from deep within a memory system hierarchy (e.g., from main memory, L3 cache, L2 cache, etc.) and the CPU has to wait, a memory system stall occurs. Memory system stalls should be reduced as much as possible.

In one embodiment, each item is represented in an array with two components: (1) a pointer to the location in memory at which the item is stored, and (2) a key substring component. Each key substring component is composed of two elements: (1) the key length (i.e., the number of bytes to represent the key value), and (2) the values of the next X number of bytes of the key value beyond a common prefix for the items. The values of the next X number of bytes of the key value beyond a common prefix is referred to herein as the "key substring cache".

Memory systems are typically implemented to increase locality. That is, when main memory is accessed, memory systems typically return (e.g., into L1 cache) not only the bytes requested but also some nearby bytes. Thus, with this array data structure, each time a memory stall does occur when accessing main memory to retrieve a given item being compared, stalls are avoided for a certain number of successive items because the key substrings for the successive items are cached into the array data structure being used by the comparison function. Consequently, fewer memory operations are performed for performing comparison operations.

In one embodiment, the number of bytes used for the key substring cache is two bytes, and the remainder of this discussion will assume a two-byte key substring cache implementation. The key substring cache may be more than two bytes; however, use of two bytes has shown to provide an efficient implementation. Hence, when a sort routine calls a comparison function, the first two bytes of each item that the function needs to compare the two items are stored directly in the array.

Figure 2:
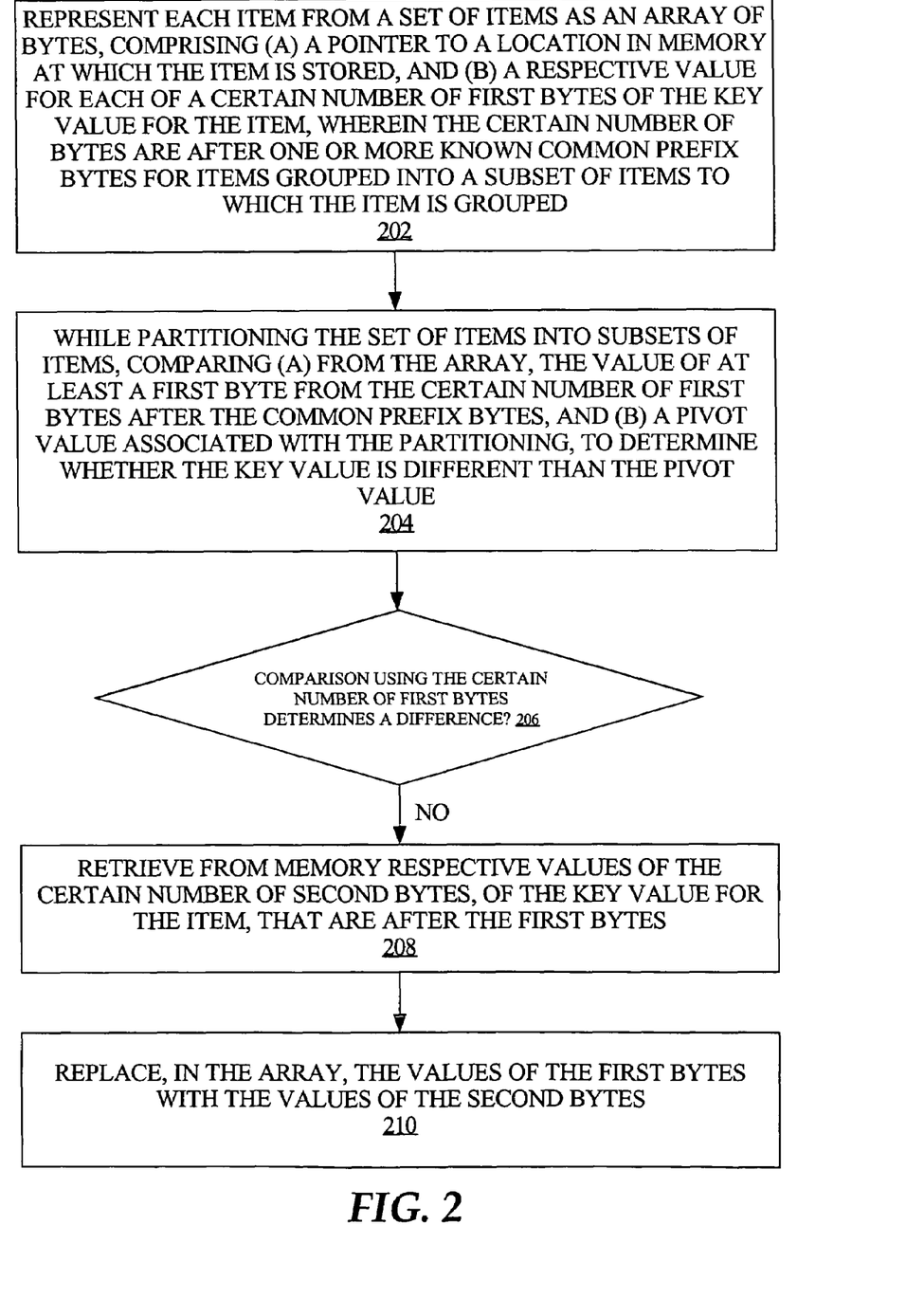
FIG. 2 is a flow diagram that illustrates a method for sorting a set of items, according to an embodiment of the invention.

FIG. 2 is a flow diagram that illustrates a method for sorting a set of items, according to an embodiment of the invention. The sorting of the items is based on one or more sort keys, where each item in the set has one or more key values that are represented by an array of bytes and the items are byte-orderable based on the arrays. FIG. 2 illustrates a key substring caching routine.

At block 202, each item from the set of items is represented as an array, or an array segment. Each item is represented in the array with (a) a pointer to a location in memory at which the item is stored; and (b) a respective value for each of a particular number of "first" bytes (where the particular number, i.e., the size of the key substring cache, is configurable and may vary from implementation to implementation) of the key value for the item. The first bytes are beyond, i.e., subsequent in order to, one or more known common prefix bytes for items grouped into a subset of items to which the item is grouped. These respective values for the first bytes are referred to herein as "key substring" bytes, and reside in cache memory when placed into the array.

At block 204, while performing a partitioning operation on the set of items to partition the set into subsets of items, compare (a) from the array in cache memory, at least one of the key substring bytes, and (b) a pivot value associated with the partitioning operation. This comparison is made in order to determine whether the item differs from the pivot value.

At block 206, it is determined whether the comparison using the key substring bytes determined a difference between the item and the pivot. If not, then the key substring cache, in the array, needs to be updated with the next particular number of bytes of the key value for the item. Thus, at block 208, respective values of the particular number of "second" bytes of the key value for the item, are retrieved from memory (e.g., main memory). The second key substring bytes are beyond, i.e., subsequent in order to, the first key substring bytes in a byte-array representation of the key values for the item. Retrieving the second bytes from memory constitutes a memory stall; however, extra key substring bytes are retrieved and cached during this memory operation, thereby avoiding successive memory stalls to retrieve one byte at a time from memory.

At block 210, the key substring cache is updated for the item, by replacing the first key substring bytes, in the array, with the second key substring bytes.

—Input Data Structure Example

In one embodiment, the array may be composed of two sub-arrays: (1) a sub-array composed of a contiguous array of pointers for the items, and (2) a sub-array composed of a contiguous array of the key substring components for the items. As part of a main memory access, the key substring sub-array is populated with the key substring bytes for a number of successive items. Therefore, the comparison function can use the cached key substring bytes for comparing two items (such as comparing an item's key value with the pivot value, in the context of quicksort). Only if the two items being compared do not differ in those two cached bytes, does the pointer sub-array need to be accessed, pointers dereferenced and another main memory operation performed.

In one embodiment, the items to be sorted (referred to as rows) are stored in a data structure that has the following format:

array_segment-->array_segment-->array_segment-> . . . -->array_segment; where array_segment stores
(a) an array of row pointers (4 or 8 bytes for each pointer);
(b) an array of key substrings (2 bytes for each key, but may be larger);
(c) an array of key lengths (2 bytes for each key); and each array segment contains a pointer that references the next array segment.

A format for the data in the array segment may be as follows:

row_ptr1|row_ptr2| . . . |row_ptrN|sub1|len1|sub2|len2| . . . |subN|lenN; where row_ptrX is a pointer to a row to be sorted;
subX is the key substring cache for the corresponding row;
lenX is the length of the key for the corresponding row —Using Key Substring Caching with Common Prefix Skipping Quicksort In the context of a quicksort algorithm in which a common prefix computation is incorporated, key substring caching can be used as follows. When the new common prefix for the "lt" set or the "gt" increases by two or more bytes, update the cached key substring bytes. Thus, the first two bytes after the common prefix are always cached as the key substring bytes.

Recall that for the CPS-QS technique described herein, each recursive invocation utilizes the newly computed common prefixes from the previous recursion. When invoking a recursion, if the new common prefix is the same as the common prefix for the previous recursion, then the key substring cache does not need to be updated. If the new common prefix is one byte greater than for the previous recursion, then in one embodiment, the common prefix used for the current call is reused as the common prefix for the recursive call, and the key substring cache is not updated because you still have one byte in the cache that is useful. If the new common prefix is two or more bytes greater than for the previous recursion, then the input common prefix is reset to the new common prefix, and the key substring cache is updated. That is, the common prefix used for the current call is reused as the common prefix for the recursive call when lt_CP<(CP-2) and when gt_CP<(CP-2). Generally, if key substring caching is implemented with a key substring size other than two bytes, such as with X bytes, then the key substring cache need not be updated unless the new common prefix for the next recursive call increases by X or more bytes.

Key substring caching is different than key prefix caching, as follows. With key prefix caching, a constant first N bytes of a key value are always cached. Thus, when comparing two items whose common prefix is larger than N bytes of the key value, the cached bytes are worthless. With key substring caching, any consecutive N bytes of a key value can be cached. Consequently, the cached bytes are more likely to be useful for any given comparison. For example, the bytes that are cached with key substring caching may depend on the current common prefix associated with the items being compared, as described above in the context of CPS-QS. Hence, the cached key substring bytes are kept useful by adaptively updating the bytes in cache, i.e., based on the common prefixes as they are updated from recursion to recursion.

Key substring caching can also be readily used with radix sort algorithms, adaptive quicksort ("AQS"), described hereafter, and most significant digit radix sort ("MSD"), which all access the array elements sequentially. Furthermore, some hardware can detect sequential memory access patterns and prefetch the next cache line.

—Using Key Substring Caching with Most Significant Digit Radix Sort

With MSD, initially the common prefix is zero bytes. For each recursive invocation of MSD, the common prefix increases by one. Therefore, assuming a two-byte cache, the rules for updating the key substring cache are that for every two invocations, the cache needs to be updated because each invocation compares the next byte over from the previous invocation.

For example, with a three-byte key, the first invocation fetches three bytes from main memory and encounters a memory stall. The first invocation uses the first byte to compare two items, and caches the remaining two bytes. The second recursive invocation uses the first byte in cache to compare two items. The third recursive invocation uses the second byte in cache to compare two items. Then, three more bytes are fetched from main memory and another memory stall is encountered. Therefore, memory stalls are reduced by a factor of three in this example. In general, MSD dereferences the record pointer and encounters a memory stall once every (X+1) passes, where X is the size of the cache. When it dereferences the record pointer, the next (X+1) bytes are fetched from the key and the next X bytes are stored in the key substring field.

Adaptive Quicksort ("AQS")

The term "adaptive quicksort" refers to a hybrid of radix sort and common prefix skipping quicksort. AQS uses two functions that are mutually recursive, in that each of the functions calls the other in a recursive step. One function implements common prefix skipping quicksort, the other function implements radix sort. In one embodiment, most significant digit radix sort is used for the radix sort function.

In one embodiment, the common prefix skipping quicksort function determines the common prefix for each partition of the input data (e.g., the partition for data that is less than the pivot, the partition for data that is greater than the pivot, and the partition for data that is equal to the pivot). In the following description, the items being sorted are referred to as "rows." However, it is not a requirement that the items are necessarily stored in a relational table structure.

In one embodiment, the common prefix skipping quicksort function then invokes the radix sort function to partition the data into no more than 256 sets (also referred to as "buckets"), in each quicksort partition, on the first byte beyond the common prefix for that partition. The radix sort function increments the common prefix for each partition by one, and then invokes the common prefix skipping quicksort function on each partition of the data that the radix sort function created.

—Using Adaptive Quicksort with Key Substring Caching

The following example describes AQS (adaptive quicksort), with key substring caching. When first invoked, the key substring cache in the byte array for each sort key contains the first two bytes of the key. All comparisons between key values are first performed using the bytes from the key values stored in the key substring cache. Only when those bytes are equal are key values fetched, by dereferencing the pointer to the row. The rows are stored in a data structure that has the array segment format described above.

—(I) The AQS Quicksort Function ("aqs-qs")

Assume that each row has a key which is used to determine the order between two rows, and that the key is byte orderable (i.e., a byte-by-byte comparison can determine the order between two key values). When invoked, the AQS quicksort function is provided a set of rows (the input) and a value (the common prefix) that describes the length of the prefix that is the same for all of the key values. When invoked, the key substring cache bytes for each key in the input rows contain the first two bytes of the key beyond the common prefix.

Select one key value from the input. This value is the quicksort pivot value (referred to hereafter simply as "the pivot"). In one embodiment, the pivot is selected by choosing sample of key values from the input and using the median of the sample as the pivot, where the size of the sample is small (e.g., no more than 20 key values).

Create three partitions from the input by comparing each key value in the input with the pivot. One partition contains all input rows with keys that are less than the pivot (the "less than" partition), another contains all input rows with keys that are greater than the pivot (the "greater than" partition), and the last contains all rows with keys that are equal to the pivot (the "equal to" partition). All comparisons start at the first byte beyond the common prefix and start with the bytes stored in the key substring cache of the byte array. When comparing keys with the pivot, determine the index (i.e., which particular byte) in the key value at which the first difference between the key value and the pivot occurs. Assuming that the index to bytes in the key value starts with 0 (rather than 1), then the index at which the first difference occurs is the common prefix between the key value and the pivot.

When placing a key value into the "less than" partition, determine the minimum value for all common prefixes computed between the key and the pivot, as described herein. This common prefix is referred to as the common prefix for the "less than" partition. When placing a key into the "greater than" partition, determine the minimum value for all common prefixes computed between the key and the pivot, as described herein. This common prefix is referred to as the common prefix for the "greater than" partition. At this point all rows from the input have been put into one of the three partitions.

If there is only one row in the "less than" partition, then place that row at the end of the result list. Otherwise, there is more than one row in the "less than" partition and the following steps are performed.

Recursively invoke the radix sort function ("aqs-rdx") with the rows in the "less than" partition as the input, the common prefix for the "less than" partition (the first byte beyond the common prefix is used to partition keys during the radix sort step), and the common prefix for the input to the current call (which specifies the offset of the first byte in the key substring cache). The common prefix from the input for the current call is passed to the radix sort step because the key substring entries have not been updated. The key substring entries can be used when it is known which key bytes are stored in the key substring entry, and that is done by using the common prefix as mentioned above.

If there is only one row in the "greater than" partition, then place that row at the end of the result list. Otherwise, there is more than one row in the "greater than" partition and the following steps are performed.

Recursively invoke the radix sort function ("aqs-rdx") with the rows in the "greater than" partition as the input, the common prefix for the "greater than" partition (the first byte beyond the common prefix is used to partition keys during the radix sort step), and the common prefix for the input to the current call (which specifies the offset of the first byte in the key substring cache). The common prefix from the input for the current call is passed to the radix sort step because the key substring entries have not been updated. The key substring entries can be used when it is known which key bytes are stored in the key substring entry, and that is done by using the common prefix as mentioned above.

If there are any rows in the "equal to" pivot partition, copy those rows to the end of the result list.

—(II) The AQS Radix Sort Function (aqs-rdx)

The radix sort function is invoked with three values, the input (rows to be sorted), a partitioning index, and the input common prefix. The partitioning index is the index in the key at which the input items (e.g., rows) will be partitioned, i.e., the partitioning index specifies which byte, in respective arrays, are compared to further partition the input. Items will be placed into one of 256 buckets based on the value of the key at the partitioning index. If the partitioning index is 0, then rows will be partitioned at the first byte of the key (i.e., the first byte of the key is byte 0, the second byte of the key is byte 1, and so on). The partitioning index may be greater than the input common prefix, which is the index of the first key byte stored in the key substring cache for all input items. Thus, when the partitioning index is two greater than the input common prefix, the key substring cache bytes are constant for all input items.

After the radix sort step partitions data, it may recursively invoke the quicksort step. When that invocation is made, a new value may be used for the common prefix. A "new common prefix" is the value of the partitioning index plus one. Hence, for each quicksort partition (e.g., the "less than" and "greater than" partitions) on which the radix sort function further partitioned, the new common prefix returned by the radix sort is the value of the quicksort partition common prefix (e.g., the "less than" common prefix) plus two.

The key substring cache may be updated, as follows. When the key has enough bytes to fill the key substring cache (e.g., the length of the key is two or more greater than the new common prefix), then the appropriate bytes are copied from the key value in main memory to the key substring cache. When the key does not have enough bytes to fill the key substring cache (e.g., the length of the key is one greater than the new common prefix), then the remaining byte from the key value is copied to the first byte of the key substring cache, and the remaining byte in the key substring cache is set to 0. The key substring cache does not need to be updated when the length of the key is less than or equal to the new common prefix.

Returning to the operation of aqs-rdx, the key values are placed into partitions using one of three steps. The step to be used is determined by how much the partitioning index is greater than the input common prefix from the invoking aqs-qs function. In one embodiment, during this step, two arrays of partitions are maintained. Each array has 256 lists (list 0 to lists 255), and the arrays are addressed by the value of a key value's byte (0 to 255). In this example, the arrays are named "done-array" and "more-array".

If the partitioning index is two or more than the input common prefix, then the following is performed for each input row. The following steps will fetch up to three bytes from the key value by dereferencing the row pointer. If the row's key value has no more bytes, then the row is copied to the end of the result list. Else, if the row's key has one more byte, and the value of that byte is X, then X is not fetched in the key substring cache but is fetched by dereferencing the row pointer. The row is copied to the end of the list of rows stored in list X of "done-array". Else, that row's key value has two or more bytes, and the value of the first byte is X, then X is not fetched in the key substring cache but is fetched by dereferencing the row pointer. The row is copied to the end of the list of rows stored in list X of "more-array", and the key substring cache is updated as described above. The new common prefix used for the next recursive invocation of the quicksort step is "partitioning index +1". The key substring entries are updated so that they cache the next two bytes starting at the value of the new common prefix.

If the partitioning index is one more than the input common prefix, then the following is performed for each input row. The following steps use the value of the second byte in the key substring cache (described as X below). If the row's key value has no more bytes, then the row is copied to the end of the result list. Else, if the row's key value has one more byte, and the value of that byte is X, then the row is copied to the end of the list of rows stored in list X of "done-array". Else, that row's key value has two or more bytes, and the value of the first remaining byte (i.e., the second byte stored in the key substring cache) is X, then the row is copied to the end of the list of rows stored in list X of "more-array", and the key substring cache is updated as described above. The new common prefix used for the next recursive invocation of the quicksort step is "partitioning index +1". The key substring entries are updated so that they cache the next two bytes starting at the value of the new common prefix.

If the partitioning index is equal to the input common prefix, then the following is performed for each input row. The following steps use the value of the first byte in the key substring cache (described as X below). The first byte of the key substring cache has the value X, therefore copy the row to the end of the list of rows stored in list X of "more-array". The new common prefix used for the next recursive invocation of the quicksort step is the input common prefix. The key substring entries are not updated.

At this point all of the input rows have been processed and there are two arrays, "more-array" and "done-array", and each array may store up to 256 lists of rows. In one embodiment, the lists from both arrays are processed in order from 0 to 255 (first list 0 from "done-array" is processed, then list 0 from "more-array" is processed, then list 1 from "done-array", then list 1 from "more-array", and so on), as follows (assume X is the value of the address of the list).

For list X in "done-array", copy all rows to the end of the result list. For list X in "more-array", if there is one row, then copy that row to the end of the result list. Else, if there is more than one row, then invoke the quicksort function (aqs-qs) with list X in "more-array" as input and the new common prefix as the input common prefix.

In one embodiment, the new common prefix is only changed when the new common prefix is two or more than the input common prefix (in an implementation in which the key substring cache is two bytes). Thus, aqs-rdx function does not update the key substring cache because aqs-rdx only increases the common prefix by one byte.

In one embodiment, the aqs-rdx function is only invoked when the common prefix for the "less than" partition or the "greater than" partition is greater than the input common prefix to the invoking aqs-qs function. Otherwise, the aqs-qs function invokes itself.

—AQS Pseudo-Code

The following is example pseudo-code for an AQS implementation without key substring caching, with comments provided in-line.

```
// CPS-QS step for AQS
    //
    aqs_cps_qs(array items, int common_prefix) {
        array lt, gt, eq;           // partitions for items <, >, ==
        to pivot
        int lt_common_prefix = INF; // common prefix for
        items < pivot
        int gt_common_prefix = INF; // common prefix for
        items > pivot
        int diff_at, compare_res;
        // This step chooses the pivot by taking a sample of
        the items
        // and choosing the median of the sample.
        //
        item pivot = sample(items);
        // This is equivalent to the partitioning step done by
        quicksort.
        //
        // Each item in items is compared with pivot and put
        into one
        // of three partitions based on the result of the
        comparison.
        // The minimum common prefix is also computed during
        these
        // comparisons.
        //
        foreach (item in items)
        {
            // diff_at is set to the index of the byte at which
            the keys of item
            // and pivot differ.
            compare_res = compare(item, pivot,
            common_prefix, &diff_at);
            if (compare_res < 0)           // item < pivot
            {
                lt.append(item);
                lt_common_prefix = min(lt_common_prefix,
                diff_at);
            }
            else if (compare_res == 0)   // item == pivot
                eq.append(item);
            else                          // item > pivot
            {
                gt.append(item);
                gt_common_prefix = min(gt_common_prefix,
                diff_at);
            }
        }
        // do radix sort step for the less than partition
        if (!lt.empty( ))
```

```
            -continued

{
            aqs_radix(lt, lt_common_prefix);
            add_to_result(lt);
        }
        // add to array containing the final result
        if (!eq.emtpy( ))
            add_to_result(eq);
        // do radix sort step for the greater than partition
        if (!gt.empty( ))
        {
            aqs_radix(gt, gt_common_prefix);
            add_to_result(gt);
        }
    }
    // radix sort step for AQS
    //
    aqs_radix(array items, int common_prefix)
    {
        array more_buckets[256];
        array done_buckets[256];
        foreach (item in items)
        {
            if (item.length( ) == common_prefix)
            {
                add_to_result(item); // item.key ends before
                common_prefix
            }
            else if (item.length( ) == (common_prefix + 1))
            { // item.key ends at common_prefix
                // add item to bucket based on byte at key
                [common_prefix ]
                done_buckets[ item.key[common_prefix]].
                append( item );
            }
            else
            { // item.key ends after common_prefix
                // add item to bucket based on byte at key
                [common_prefix ]
                more_buckets[ item.key[common___prefix]].
                append( item );
            }
        }
        for (i = 0 .. 255)
        {
            if (!done_buckets[i].emtpy( ))
                add_to_result(done_buckets [i]);
            if (!more_buckets[i].empty( ))
                aqs_cps_qs(more_buckets, common_prefix+1);
        }
    }
```

Sort Performance Enhancments

A sort algorithm is often described as "blocking" because such an algorithm typically must consume all of its input before producing any output. However, a sort algorithm does not have to fully sort all of its input before producing any output. Rather, a sort algorithm can partially order its input by dividing its input into two sets, A and B, where everything in A is less than everything in B. Then, the algorithm can fully sort A and produce A as the first part of its output, and then proceed to fully sort B.

There are at least two areas in a relational database management system (RDBMS) that can benefit from a sort algorithm that partially orders a data set and immediately produces a partial result set based on the partially ordered subset of data. Such a sort algorithm is referred to hereafter as a "partial sort output" algorithm. First, some database queries are optimized for response time to get the first N rows of the query result as soon as possible, rather than optimized to minimize the time to get all rows of the query result. If such a query requires a sort, then a partial sort output algorithm can produce the first N rows of output before fully sorting the remaining rows by counting the rows as they are added to the result list and returning part of the result as soon as the result list contains N rows.

Second, a partial sort output algorithm can be used to improve the performance of external sorts, which refers to any sort algorithm that uses external memory, such as tape or disk, during the sort. Typically, when the in-memory sort runs out of memory, all of the rows buffered in memory are first sorted, and then those rows are written in order to disk. Sorting the rows buffered in memory uses CPU, and writing rows to disk uses IO. Good external sort algorithms overlap the use of CPU and IO. The partial sort output algorithm described herein can efficiently overlap the use of CPU and IO by writing rows to disk as soon as the rows are placed on the result list.

In one embodiment, a partial sort output algorithm functions as follows.

When the in-memory sort runs out of memory:
(1) compute the average size of a row, avg_row_size=number of bytes used by in-memory sort/number of rows; and
(2) compute the average number of rows required to fill an IO page, as avg_rows_IO_page=IO page size/avg_row_size.

The pseudo-code presented below performs as follows. When rows are copied to the result list, a check is performed to determine if a proper number of rows have been copied to the result list since the previous attempt to copy rows to an IO page. The check is performed every N rows (referred to as next_check_at), where N=avg_rows_IO_page, in the normal case. Assuming N=10, then rows 1-10 are copied to an IO page and then that page is written to disk. Then, rows 11-20 are written, then rows 21-30, and so on. The write of the IO page is asynchronous with respect to the sorting. After the write is scheduled (e.g., during the call to the routine that adds rows to the result list), control is immediately returned to the sort routines so that sorting is done concurrently with IO.

Two potential issues may complicate such a partial sort output algorithm. First, when enough rows have been produced to fill the next IO page, memory for that IO page might not be available. There are a finite number of IO pages. Therefore, if rows are sorted faster than IO pages are written to disk, then there will not be an IO page available after next_check_at more rows have been sorted. In this case, next_check_at is reset to a percentage of its normal value and another check is performed later in the execution of the routine. In one embodiment, next_check_at is reset to ¼ of its normal value.

Another problem that complicates a partial sort output algorithm is that the rows normally do not have a fixed size and the average number of rows for an IO page (referred to as avg_rows_IO_page) is only an estimate. Thus, when rows are copied to an IO page, the IO page may become full before all of the currently ready rows can be copied. In addition, when rows are copied, the IO page might not be full.

In the routine that adds rows to the result list, a partial sort output algorithm may perform as illustrated in the following pseudo-code:

```
initially, next_check_at = avg_rows_IO_page
                to_copy = next_check_at
next_check_at--;
if (next_check_at == 0)
{
    if (IO page available)
```

```
        {
            copy the most X recent rows copied to the result list to
            the IO page, where X = to_copy
            if (the IO page is full)
                write the IO page to disk
            else
            {
                next_check_at = avg_rows_IO_page / 4;
                to_copy = next_check_at;
            }
        }
    }
    else
    {
        next_check_at = avg_rows_IO_page / 4;
        to_copy = next_check_at;
    }
}
```

Hardware Overview

Figure 3:
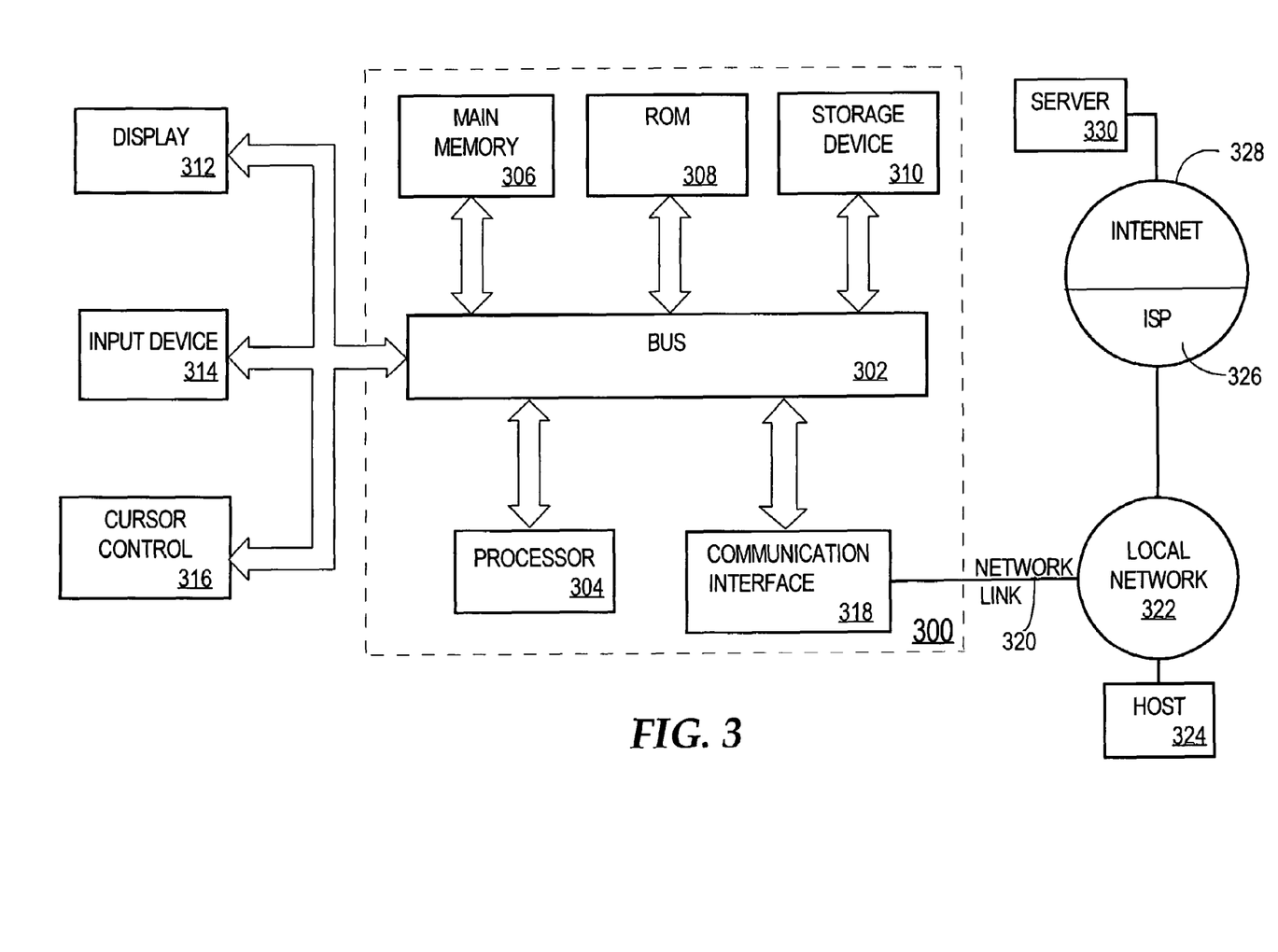
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for sorting a set of items, based on one or more sort keys, using a quicksort algorithm, wherein each item in the set of items has one or more key values that are represented by an array of one or more bytes, and wherein the set of items can be ordered based on the arrays, the method comprising the computer-implemented steps of:
   while performing a first partitioning operation on the set of items to partition the set of items into subsets of items, based on a first comparison between (a) the key value for each item in the set of items and (b) a first pivot value associated with the first partitioning operation,
      determining a total amount of common prefix bytes that exist among all key values for items partitioned into a first subset of items; and
      storing in computer memory a first number that indicates the total amount of common prefix bytes that exist among all key values for items partitioned into the first subset of items;
   performing a second partitioning operation on the first subset of items to partition the first subset of items into second subsets of items, based on a second comparison between (a) the key value for each item in the first subset of items and (b) a second pivot value;
   wherein, for each item in the first subset of items, the second comparison does not take into account the first number of common prefix bytes associated with the first subset of items;
   wherein the method is performed by one or more computing devices.

2. The method of claim 1, further comprising the computer-implemented steps of:
   while performing the second partitioning operation on the first subset of items, to partition the first subset of items into the second subsets of items, determining how many common prefix bytes exist among all key values for items partitioned into a second subset of items; and
   storing in computer memory a second number that indicates how many common prefix bytes exist among all key values for items partitioned into the second subset of items.

3. The method of claim 2, further comprising the computer-implemented steps of:
   performing a recursive partitioning operation on the second subset of items to partition the second subset of items into subsets of items, based on a comparison between (a) the key value for each item in the second subset of items and (b) a third pivot value;
   wherein, for each item in the second subset of items, the comparison between the key value and the third pivot value does not take into account the second number of common prefix bytes associated with the second subset of items.

4. The method of claim 1, further comprising the computer-implemented step of:
   representing each item in the set of items with at least (a) a pointer to a location in memory at which the item is stored and (b) a key substring component comprising a respective value of each of a certain number of one or more bytes of the key value for the item, wherein the one or more bytes of the key value are subsequent in order to the common prefix bytes associated with the subset of items to which the item is grouped.

5. The method of claim 4, wherein the step of performing the first partitioning operation includes performing the first partitioning operation based on a comparison between (a) the value of at least a first byte from the certain number of one or more bytes subsequent in order to the common prefix bytes and (b) the first pivot value associated with the first partitioning operation.

6. The method of claim 4, further comprising the computer-implemented step of:
   if the step of performing the first partitioning operation, based on a comparison between (a) respective values of a certain number of one or more first bytes subsequent in order to the common prefix bytes and (b) the first pivot value associated with the first partitioning operation, does not determine a difference in the key value for the item and the first pivot value, then
      following the pointer to the location in memory at which the item is stored,
      retrieving, from the memory, respective values of a certain number of one or more second bytes, of the key value for the item, subsequent in order to the one or more first bytes, and
      inserting into the key substring component the respective values of the one or more second bytes.

7. The method of claim 4, wherein the key substring component comprises a value of the certain number of bytes to represent the key value for the item.

8. The method of claim 1, further comprising the computer-implemented steps of:
   determining a number of items of the set of items that are copied to a result list; and
   if the number of items copied to the result list is substantially equal to an average number of items to fill an input/output (IO) page, then
      copying the number of items of the first subset of items to an IO page; and
      writing the IO page to persistent storage.

9. The method of claim 8,
   wherein the step of writing includes scheduling a write operation to the persistent storage; and
   wherein the method further comprises the computer-implemented step of:
      returning control immediately to a sort routine so that sorting is performed concurrently with writing the IO page to persistent storage.

10. The method of claim 1, wherein sorting the set of items is performed during execution of a database query, the method further comprising the computer-implemented steps of:
   determining a number of items of the set of items that are copied to a result list;
   and if the number of items copied to the result list is substantially equal to a number of items in a query result set for which the query is optimized, then
   returning, as a query result set, the number of items of the first subset of items.

11. A computer-readable storage medium that stores instructions for sorting a set of items, based on one or more sort keys, using a quicksort algorithm, wherein each item in the set of items has one or more key values that are represented by an array of one or more bytes, and wherein the set of items can be ordered based on the arrays, which, when executed by one or more processors, cause the one or more processors to perform the steps of:
   while performing a first partitioning operation on the set of items to partition the set of items into subsets of items, based on a first comparison between (a) the key value for each item in the set of items and (b) a first pivot value associated with the first partitioning operation,
      determining a total amount of common prefix bytes that exist among all key values for items partitioned into a first subset of items; and
      storing in computer memory a first number that indicates the total amount of common prefix bytes that exist among all key values for items partitioned into the first subset of items;
   performing a second partitioning operation on the first subset of items to partition the first subset of items into second subsets of items, based on a second comparison between (a) the key value for each item in the first subset of items and (b) a second pivot value;
   wherein, for each item in the first subset of items, the second comparison does not take into account the first number of common prefix bytes associated with the first subset of items.

12. A method for sorting a set of items, based on one or more sort keys, wherein each item in the set of items has one or more key values that are represented by an array of one or more bytes, and wherein the set of items can be ordered based on the arrays, the method comprising the computer-implemented steps of:
   representing each item in the set of items with at least (a) a pointer to a location in memory at which the item is stored and (b) a key substring component comprising a respective value of each of a certain number of one or more bytes of the key value for the item, wherein the one or more bytes of the key value are subsequent in order to one or more known common prefix bytes among all key values for items in the set of items;
   wherein the key substring component does not represent values of the one or more known common prefix bytes; and
   while performing a partitioning operation on the set of items to group the set of items into subsets of items, comparing (a) from the key substring component, the value of at least a first byte from the certain number of one or more bytes subsequent in order to the common prefix bytes and (b) a pivot value associated with the partitioning operation, to determine whether the key value is different than the pivot value;
   wherein the method is performed by one or more computing devices.

13. The method of claim 12, the computer-implemented steps further comprising:
   if the step of performing the partitioning operation based on comparing (a) from the key substring component, respective values of a certain number of one or more first bytes subsequent in order to the common prefix bytes and (b) the pivot value associated with the partitioning operation, does not determine a difference in the key value and the pivot value, then
      following the pointer to the location in memory at which the item is stored;
      retrieving, from the memory, respective values of a certain number of one or more second bytes, of the key value for the item, subsequent in order to the one or more first bytes; and
      replacing, in the key substring component, the respective values of the one or more first bytes with the respective values of the one or more second bytes.

14. The method of claim 12, wherein the step of performing the partitioning operation includes performing a quicksort partitioning operation.

15. The method of claim 12, wherein the step of performing the partitioning operation includes performing a radix sort partitioning operation.

16. A computer-readable storage medium for sorting a set of items, based on one or more sort keys, wherein each item in the set of items has one or more key values that are represented by an away of one or more bytes, and wherein the set of items can be ordered based on the arrays, which, when executed by one or more processors, cause the one or more processors to perform the steps of:
   representing each item in the set of items with at least (a) a pointer to a location in memory at which the item is stored and (b) a key substring component comprising a respective value of each of a certain number of one or more bytes of the key value for the item, wherein the one or more bytes of the key value are subsequent in order to one or more known common prefix bytes among all key values for items in the set of items;
   wherein the key substring component does not represent values of the one or more known common prefix bytes; and
   while performing a partitioning operation on the set of items to group the set of items into subsets of items, comparing (a) from the key substring component, the value of at least a first byte from the certain number of one or more bytes subsequent in order to the common prefix bytes and (b) a pivot value associated with the partitioning operation, to determine whether the key value is different from the pivot value.

17. A method for sorting a set of items, based on one or more sort keys, wherein each item in the set of items has one or more key values that are represented by an array of one or more bytes, and wherein the set of items can be ordered based on the arrays, the method comprising the computer-implemented steps of:
   while performing a first partitioning operation on the set of items to partition the set of items into first subsets of items, based on a comparison between (a) the key value for each item in the set of items and (b) a first pivot value associated with the first partitioning operation,
      computing a common prefix value that identifies a maximum number of one or more common prefix bytes among all key values for items partitioned into a particular first subset of items wherein the key values for the items partitioned into the particular first subset of items have at least one byte that is not in common; and determining whether the common prefix value associated with the particular first subset of items is greater than a common prefix value input to the first partitioning operation;

in response to determining that the common prefix value associated with the particular first subset of items is greater than the common prefix value input to the first partitioning operation, performing a second partitioning operation on the particular first subset of items to partition the particular first subset of items into second subsets of items, based on the value of a byte at a location, within the array for an item, that is immediately subsequent in order to the one or more common prefix bytes for items partitioned into the particular first subset of items;

wherein the first partitioning operation is a quicksort partitioning operation and the second partitioning operation is a radix sort partitioning operation; and wherein the method is performed by one or more computing devices.

18. The method of claim 17, wherein the first partitioning operation partitions the set of items into three first subsets of items.

19. The method of claim 18, wherein the second partitioning operation partitions the set of items into, at most, two hundred fifty-six second subsets of items.

20. The method of claim 17, further comprising the computer-implemented steps of:

as part of performing the second partitioning operation, generating a new common prefix value by incrementing by one the common prefix value associated with the particular first subset of items; and performing a third partitioning operation on each of one or more of the second subsets of items to partition the one or more second subsets of items into one or more third subsets of items, based on a comparison between (a) the key value for each item in the second subset of items and (b) a second pivot value associated with the third partitioning operation, wherein, for each item in the second subsets of items, the comparison between the key value and the second pivot value does not compare common prefix bytes identified by the new common prefix value.

21. The method of claim 20, wherein the first and third partitioning operations are quicksort partitioning operations and the second partitioning operation is a radix sort partitioning operation.

22. A computer-readable storage medium that stores instructions for sorting a set of items, based on one or more sort keys, wherein each item in the set of items has one or more key values that are represented by an array of one or more bytes, and wherein the set of items can be ordered based on the arrays, which, when executed by one or more processors, cause the one or more processors to perform the steps of:

while performing a first partitioning operation on the set of items to partition the set of items into first subsets of items, based on a comparison between (a) the key value for each item in the set of items and (b) a first pivot value associated with the first partitioning operation, computing a common prefix value that identifies a maximum number of one or more common prefix bytes among all key values for items partitioned into a particular first subset of items wherein the key values for the items partitioned into the particular first subset of items have at least one byte that is not in common; and determining whether the common prefix value associated with the particular first subset of items is greater than a common prefix value input to the first partitioning operation;

in response to determining that the common prefix value associated with the particular first subset of items is greater than the common prefix value input to the first partitioning operation, performing a second partitioning operation on the particular first subset of items to partition the particular first subset of items into second subsets of items, based on the value of a byte at a location, within the array for an item, that is immediately subsequent in order to the one or more common prefix bytes for items partitioned into the particular first subset of items;

wherein the first partitioning operation is a quicksort partitioning operation and the second partitioning operation is a radix sort partitioning operation.

23. The method of claim 12, wherein the step of representing each item in the set of items further comprises:

creating an array comprising a plurality of sub-arrays;

wherein a first sub-array of the plurality of sub-arrays comprises pointers for each item of the set of items;

wherein a second sub-array of the plurality of sub-arrays comprises the key substring component for each item of the set of items; and representing information for each item of the set of items in the first sub-array and in the second sub-array.

24. The computer-readable storage medium of claim 11, further comprising instructions for:

while performing the second partitioning operation on the first subset of items, to partition the first subset of items into the second subsets of items, determining how many common prefix bytes exist among all key values for items partitioned into a second subset of items; and storing in computer memory a second number that indicates how many common prefix bytes exist among all key values for items partitioned into the second subset of items.

25. The computer-readable storage medium of claim 24, further comprising instructions for:

performing a recursive partitioning operation on the second subset of items to partition the second subset of items into subsets of items, based on a comparison between (a) the key value for each item in the second subset of items and (b) a third pivot value;

wherein, for each item in the second subset of items, the comparison between the key value and the third pivot value does not take into account the second number of common prefix bytes associated with the second subset of items.

26. The computer-readable storage medium of claim 11, further comprising instructions for:

representing each item in the set of items with at least (a) a pointer to a location in memory at which the item is stored and (b) a key substring component comprising a respective value of each of a certain number of one or more bytes of the key value for the item, wherein the one or more bytes of the key value are subsequent in order to the common prefix bytes associated with the subset of items to which the item is grouped.

27. The computer-readable storage medium of claim 26, wherein the instructions for the step of performing the first partitioning operation includes instructions for performing the first partitioning operation based on a comparison between (a) the value of at least a first byte from the certain number of one or more bytes subsequent in order to the common prefix bytes and (b) the first pivot value associated with the first partitioning operation.

28. The computer-readable storage medium of claim 26, further comprising instructions for:
    if the step of performing the first partitioning operation, based on a comparison between (a) respective values of a certain number of one or more first bytes subsequent in order to the common prefix bytes and (b) the first pivot value associated with the first partitioning operation, does not determine a difference in the key value for the item and the first pivot value, then
        following the pointer to the location in memory at which the item is stored,
        retrieving, from the memory, respective values of a certain number of one or more second bytes, of the key value for the item, subsequent in order to the one or more first bytes, and
        inserting into the key substring component the respective values of the one or more second bytes.

29. The computer-readable storage medium of claim 26, wherein the key substring component comprises a value of the certain number of bytes to represent the key value for the item.

30. The computer-readable storage medium of claim 11, further comprising instructions for:
    determining a number of items of the set of items that are copied to a result list; and
    if the number of items copied to the result list is substantially equal to an average number of items to fill an input/output (IO) page, then
        copying the number of items of the first subset of items to an IO page; and writing the IO page to persistent storage.

31. The computer-readable storage medium of claim 30, wherein the instructions for the step of writing includes instructions for scheduling a write operation to the persistent storage, and further comprising instructions for:
    returning control immediately to a sort routine so that sorting is performed concurrently with writing the IO page to persistent storage.

32. The computer-readable storage medium of claim 11, wherein sorting the set of items is performed during execution of a database query, and further comprising instructions for:
    determining a number of items of the set of items that are copied to a result list; and
    if the number of items copied to the result list is substantially equal to a number of items in a query result set for which the query is optimized, then returning, as a query result set, the number of items of the first subset of items.

33. The computer-readable storage medium of claim 16, further comprising instructions for:
    if the step of performing the partitioning operation based on comparing (a) from the key substring component, respective values of a certain number of one or more first bytes subsequent in order to the common prefix bytes and (b) the pivot value associated with the partitioning operation, does not determine a difference in the key value and the pivot value, then
        following the pointer to the location in memory at which the item is stored;
        retrieving, from the memory, respective values of a certain number of one or more second bytes, of the key value for the item, subsequent in order to the one or more first bytes; and
        replacing, in the key substring component, the respective values of the one or more first bytes with the respective values of the one or more second bytes.

34. The computer-readable storage medium of claim 16, wherein the instructions for the step of performing the partitioning operation include instructions for performing a quick-sort partitioning operation.

35. The computer-readable storage medium of claim 16, wherein the instructions for the step of performing the partitioning operation include instructions for performing a radix sort partitioning operation.

36. The computer-readable storage medium of claim 16, wherein the instructions for the step of representing each item in the set of items further comprises instructions for:
    creating an away comprising a plurality of sub-arrays;
        wherein a first sub-array of the plurality of sub-arrays comprises pointers for each item of the set of items;
        wherein a second sub-array of the plurality of sub-arrays comprises the key substring component for each item of the set of items; and
    representing information for each item of the set of items in the first sub-array and in the second sub-array.

37. The computer-readable storage medium of claim 22, wherein the first partitioning operation partitions the set of items into three first subsets of items.

38. The computer-readable storage medium of claim 3, wherein the second partitioning operation partitions the set of items into, at most, two hundred fifty-six second subsets of items.

39. The computer-readable storage medium of claim 22, further comprising instructions for:
    as part of performing the second partitioning operation, generating a new common prefix value by incrementing by one the common prefix value associated with the particular first subset of items; and
    performing a third partitioning operation on each of one or more of the second subsets of items to partition the one or more second subsets of items into one or more third subsets of items, based on a comparison between (a) the key value for each item in the second subset of items and (b) a second pivot value associated with the third partitioning operation,
    wherein, for each item in the second subsets of items, the comparison between the key value and the second pivot value does not compare common prefix bytes identified by the new common prefix value.

40. The computer-readable storage medium of claim 39, wherein the first and third partitioning operations are quick-sort partitioning operations and the second partitioning operation is a radix sort partitioning operation.

* * * * *

UNITED STATES PATENT AND TRADEMARK OFFICE
CERTIFICATE OF CORRECTION

PATENT NO. : 7,680,791 B2
APPLICATION NO. : 11/039024
DATED : March 16, 2010
INVENTOR(S) : Mark D. Callaghan et al.

It is certified that error appears in the above-identified patent and that said Letters Patent is hereby corrected as shown below:

On Title page, in field (56), under "Other Publications", column 2, line 7, delete "Algoithms" and insert -- Algorithms --, therefor.

In column 9, line 38, after "choosing" insert -- a --.

In column 11, line 25, delete "Xof" and insert -- X of --, therefor.

In column 13, line 46, delete "Enhancments" and insert -- Enhancements --, therefor.

In column 20, line 28, in Claim 16, delete "away" and insert -- array --, therefor.

In column 24, line 21, in Claim 36, delete "away" and insert -- array --, therefor.

In column 24, line 32, in Claim 38, delete "claim 3," and insert -- claim 37, --, therefor.

Signed and Sealed this

Twenty-eighth Day of September, 2010

David J. Kappos
*Director of the United States Patent and Trademark Office*